(12) United States Patent
Brusselback (10) Patent No.: US 10,040,402 B1
(45) Date of Patent: Aug. 7, 2018

(54) BIKE LIFTING CARGO RACK FOR VEHICLES

(71) Applicant: Lawrence James Brusselback, Newport, OR (US)

(72) Inventor: Lawrence James Brusselback, Newport, OR (US)

( * ) Notice: Subject to any disclaimer, the term of this patent is extended or adjusted under 35 U.S.C. 154(b) by 0 days.

(21) Appl. No.: 15/711,439

(22) Filed: Sep. 21, 2017

Related U.S. Application Data

(60) Provisional application No. 62/600,772, filed on Feb. 28, 2017.

(51) Int. Cl.
*B60R 9/00* (2006.01)
*B60R 9/042* (2006.01)
*B60R 9/10* (2006.01)
*B60R 9/048* (2006.01)
*B60R 9/045* (2006.01)

(52) U.S. Cl.
CPC .............. *B60R 9/042* (2013.01); *B60R 9/045* (2013.01); *B60R 9/048* (2013.01); *B60R 9/10* (2013.01)

(58) Field of Classification Search
CPC ............................ B60R 9/042; Y10S 224/924
USPC .................................................. 224/310, 924
See application file for complete search history.

(56) References Cited

U.S. PATENT DOCUMENTS

| | | | |
|---|---|---|---|
| 4,728,244 A | 3/1988 | Stokkendal | |
| 4,887,754 A | 12/1989 | Boyer et al. | |
| 5,360,150 A | 11/1994 | Praz | |
| 5,544,796 A | 8/1996 | Dubach | |
| 5,709,521 A | 1/1998 | Glass et al. | |
| 6,149,039 A * | 11/2000 | Englander | B60R 9/042 224/310 |
| 6,561,396 B2 * | 5/2003 | Ketterhagen | B60R 9/042 224/310 |
| 6,638,000 B2 | 10/2003 | Groves | |
| 9,409,526 B2 * | 8/2016 | Giamatti | B60R 9/042 |
| 2002/0005422 A1 * | 1/2002 | Nusbaum | B60R 9/048 224/501 |
| 2007/0007316 A1 * | 1/2007 | Witczak | B60R 9/042 224/310 |
| 2011/0042432 A1 * | 2/2011 | Elezaj | B60R 9/0423 224/321 |
| 2011/0240700 A1 * | 10/2011 | Williams | B60R 9/10 224/518 |

* cited by examiner

*Primary Examiner* — Adam Waggenspack
(74) *Attorney, Agent, or Firm* — Harpman & Harpman (57) ABSTRACT

A vehicle rooftop bicycle carrier and lifting apparatus for vehicles has a roof rack with a pneumatic lifting spring urged pivoted boom assembly interconnected by multiple pivot linkage thereto. A bike clamp is adjustably positioned on the extended boom assembly for selectively securing a bike to be lifted and secured on the roof rack for transport in vertical upright orientation.

6 Claims, 7 Drawing Sheets

BIKE LIFTING CARGO RACK FOR VEHICLES

This application claims the benefit of U.S. Provisional Application No. 62/600,772, filed Feb. 28, 2017.

BACKGROUND OF THE INVENTION

1. Technical Field

This invention relates to bicycle carriers for vehicle rooftop attachment.

2. Description of Prior Art

A variety of prior art devices have been developed for bicycle transportation on vehicles including bike racks extending from the rear of vehicles and roof racks for bike transport.

Examples of such prior art devices can be seen U.S. Pat. Nos. 4,728,244, 4,887,754, 5,360,150, 5,544,796, 5,709,521 and 6,638,000.

In U.S. Pat. No. 4,728,244, a combined roof rack and cart is disclosed.

The roof rack frame has rollers and is selectively deployed on a support shaft extending down along the side of the vehicle.

U.S. Pat. No. 4,887,758 is directed to a portable device for retaining a bicycle in conjunction with a conventional sports equipment transport rack on the roof of a vehicle. It is configured to hold the bike beside the vehicle for repairs.

U.S. Pat. No. 5,360,150 claims a roof rack for vehicles having a pivoting/sliding extension to lower the load laterally of the vehicle. The load remains horizontal during its repositioning.

U.S. Pat. No. 5,544,796 discloses a roof rack for vehicles having a pair of spaced parallel tracks that pivot out and extend downwardly along the side of the vehicle for placement of sleighs thereon for transport.

U.S. Pat. No. 5,709,521 is directed to a lift assist bicycle carrier for car roof tops and adjustable column standards has a lift bar central end pivot for a roof top mounted rack with a power stroke lift device to transfer power to the column standard to assist in raising the attached bike on the end of the arm.

U.S. Pat. No. 6,638,000 describes a bicycle lift for a vehicle roof rack having a lift arm holding a bike to a rotatable shaft on the roof. A crank or motorized mechanism empowers a gear drive to rotate the shaft lifting the arm while the bike is attached to the roof rack.

SUMMARY OF THE INVENTION

A lift assist device for bicycle loading and unloading onto a roof top bike transport rack on a vehicle in upright position. An adjustable two-part pivot bike receiving boom arm assembly is interconnected to a multiple pivot linkage with an interconnected assist lift cylinder. The pivoted boom assembly has a selective interlocking boom arm pivot lift with an adjustable bike engagement clamp on its distal arm. The compound linkage assembly and gas cylinder provides for assisted boom assembly deployment and retrieval of a bike secured on the engagement clamp of the boom for the roof mounted rack.

DETAILED DESCRIPTION OF THE INVENTION

Referring to FIGS. 1-5 of the drawings, a bike lifting rack assembly 10 of the invention can be seen for mounting on a roof 11 of a vehicle 12. The bike lifting roof rack 10 has a main support mounting rack 13, best seen in FIG. 4 of the drawings having a pair of spaced parallel tubular elements 14 and 15. The tubular elements 14 and 15 are secured to one another by a corresponding pair of interconnecting elements 16 and 17 at their respective free ends 14A, 14B, 15A and 15B. A bike lift mounting assembly 18 is formed by a main rack element 19 extending between the tubular elements 14 and 15 with multiple parallel spaced interconnecting bars 20 extending therethrough and engaging the corresponding respective interconnecting elements 16 and 17. The mounting rack 13 is preferably removably secured to the roof of a vehicle 12 by any conventional roof rack mounting means currently available and well known within the art.

Figure 5:
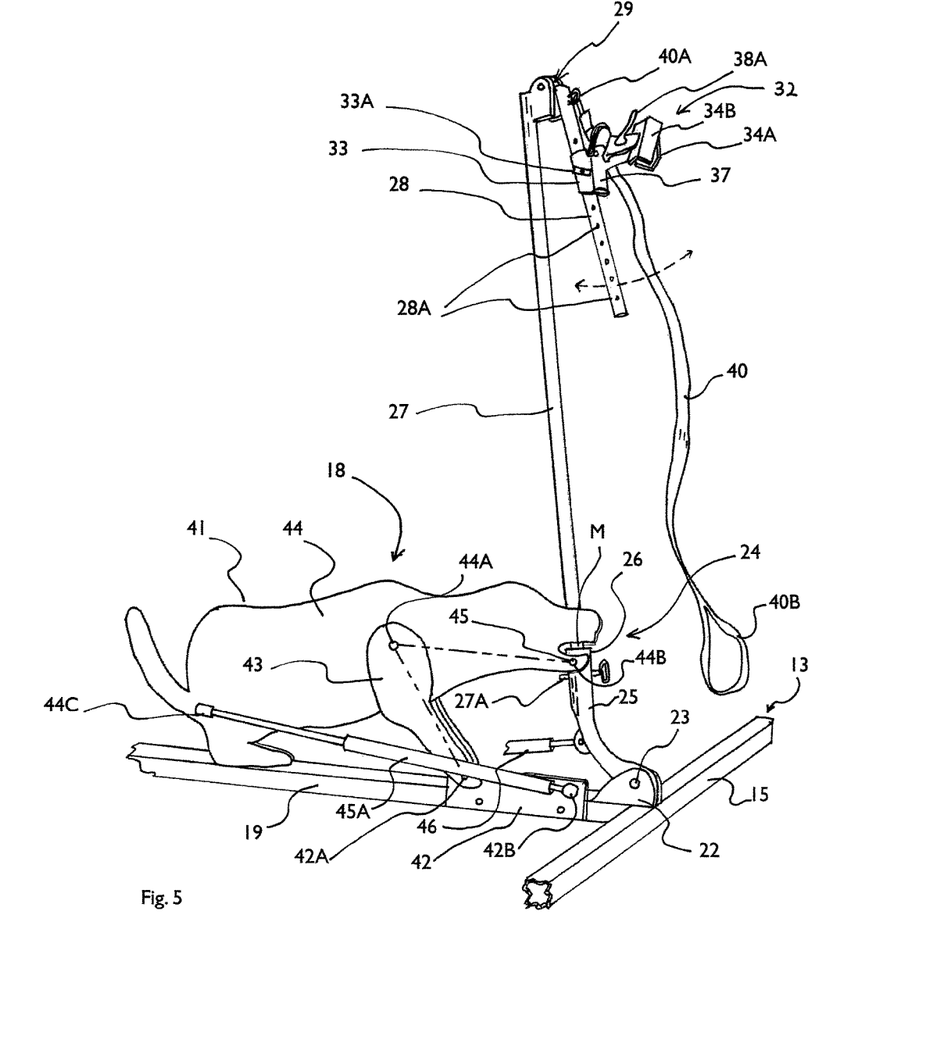
FIG. 5 is a partial perspective view of the bike lifting cargo rack of the invention.

A bike attachment and lifting assembly 18 is pivotally secured on the mounting rack 13 to the main element 19, best seen in FIG. 5 of the drawings.

Figure 6:
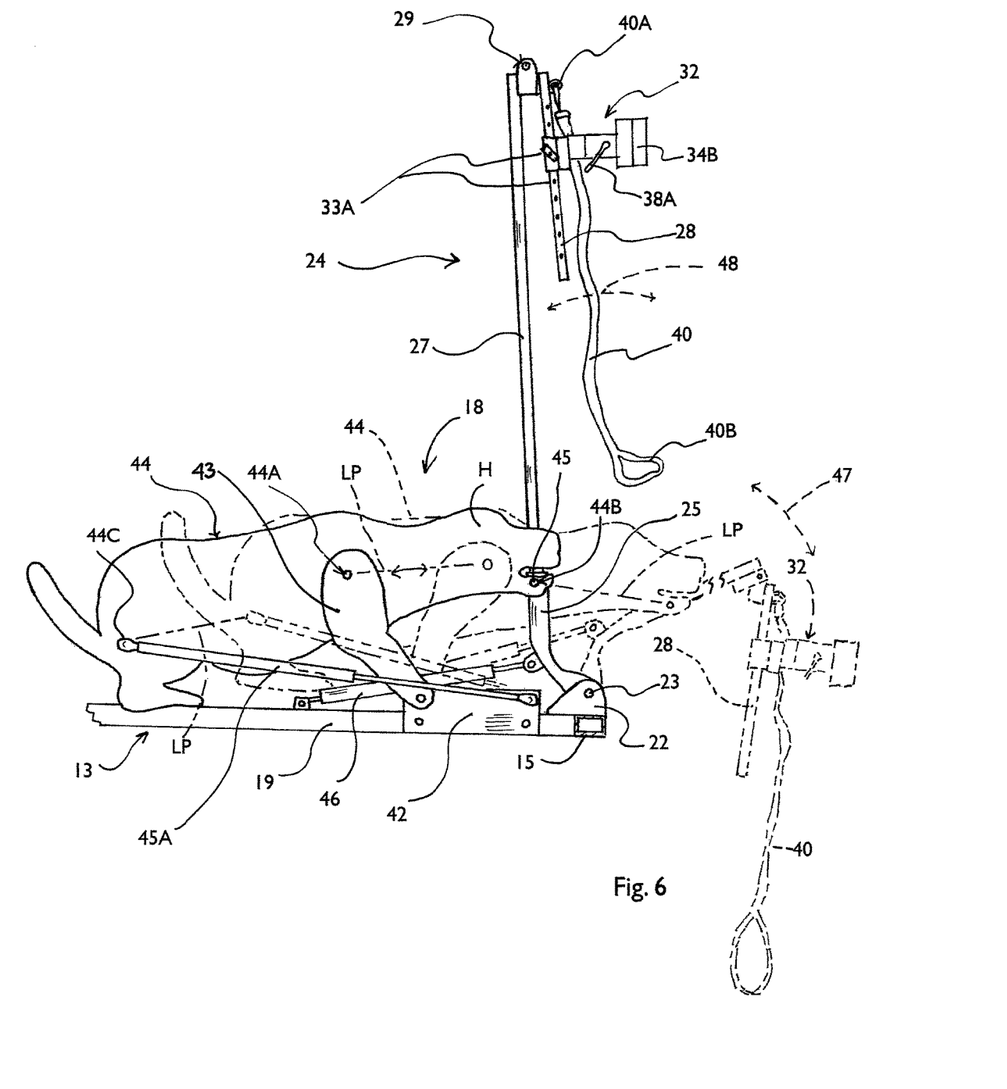
FIG. 6 is a side elevational view of the invention in solid and broken lines indicating bike engagement boom deployment.
Figure 7:
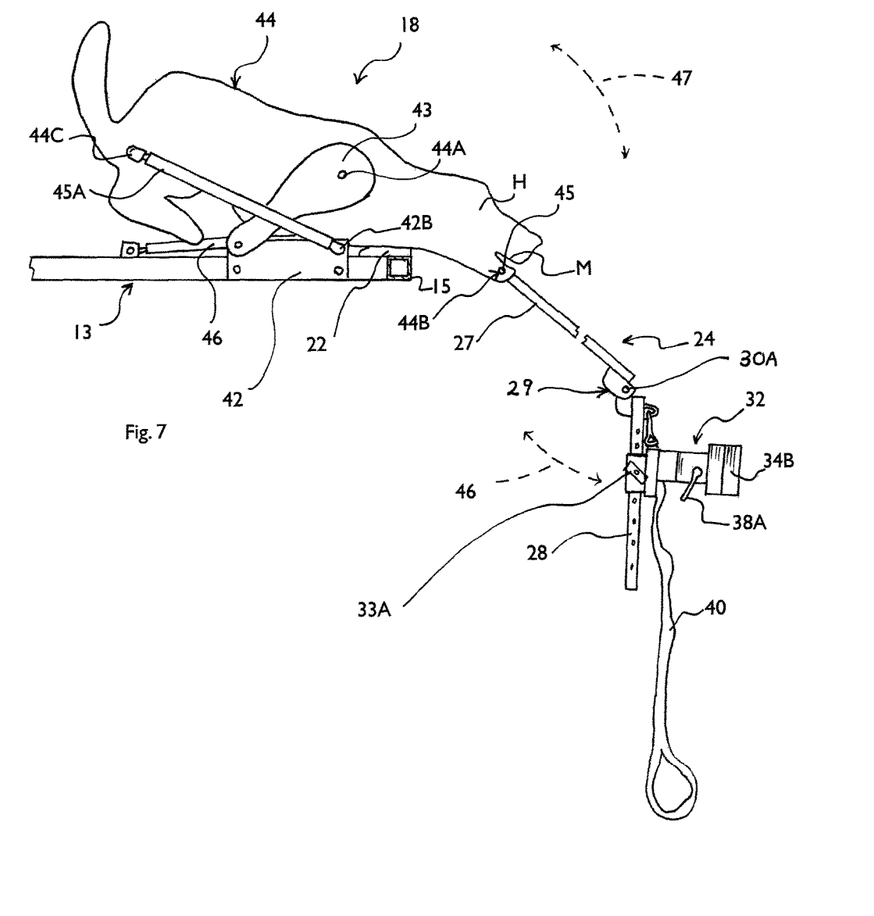
FIG. 7 is a side elevational view of the invention in full bike engagement boom deployment.

The bike lifting and attachment assembly 18 has an upstanding main mounting bracket 22 with a primary pivot pin 23 from which is pivotally secured a boom assembly 24, best seen in FIGS. 5, 6 and 7 of the drawings. The boom assembly 24 has an upstanding tubular mounting bracket 25 with a longitudinally offset apertured mounting portion which is pivotally secured by the pivot pin 23. The mounting bracket 25 has an open end at 26 for registerably receiving an upstanding first cylindrical boom 27 retained by a removable pin 27A extending through aligned apertures therein as best seen in FIG. 5 of the drawings.

A bike engagement boom 28 is adjustably secured to the free end of the first boom 27 by an interconnecting knee hinge assembly 29 having a friction engagement fitting 30.

It will therefore be evident that the engagement boom 28 can be pivoted through a range of motion dictated by the frictional engagement fitting 30 allowing for pivotal deployment from the first boom 27 as needed and illustrated in FIGS. 1-3 of the drawings and in broken lines in FIGS. 5 and 6 of the drawings to accommodate bike engagement and support as will be described in detail hereinafter.

Figure 8:
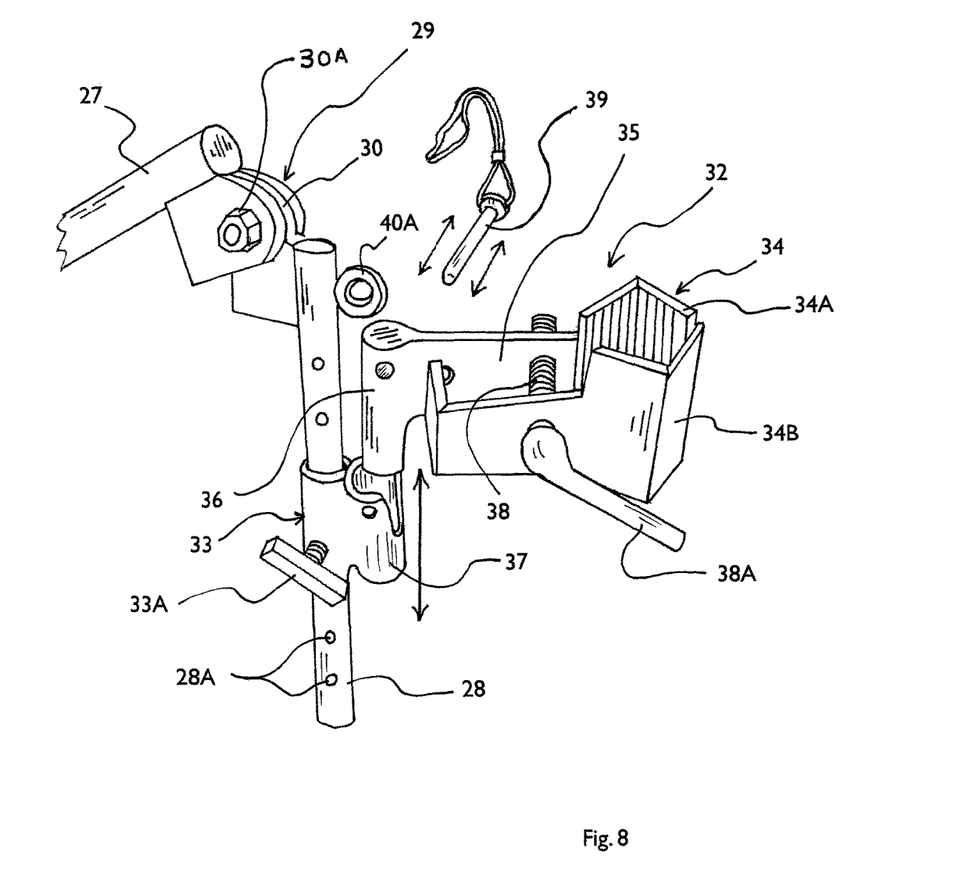
FIG. 8 is an enlarged partial perspective exploded view of a bike clamp.

A bike clamp assembly 32 is shown in FIGS. 5, 6 and 8 of the drawings as being adjustably positioned along the length of the boom 28 which has a plurality of longitudinally spaced indexing apertures 28A therein as best seen in FIG. 8 of the drawings.

The bike clamp assembly 32 has a cylindrical slidingly positioned fitting 33 with a thumb screw 33A selectively repositioning the clamp 32 as required and indicated by a directional arrow.

The clamp 32 has an adjustable dual jaw bracket 34 with a fixed jaw 34A on the end of a support arm 35 with an apertured rod portion 36 that is removably secured within a receiving sleeve 37 extending from the cylindrical slidable positioning fitting 33. An adjustable jaw 34B is adjustably engaged to the fixed jaw arm 35 by a threaded adjustment bolt fitting 38 with an activation rotational handle 38A thereon. A quick release pin 39 secures the rod portion 36 within the receiving sleeve 37 as hereinbefore described.

Figure 1:
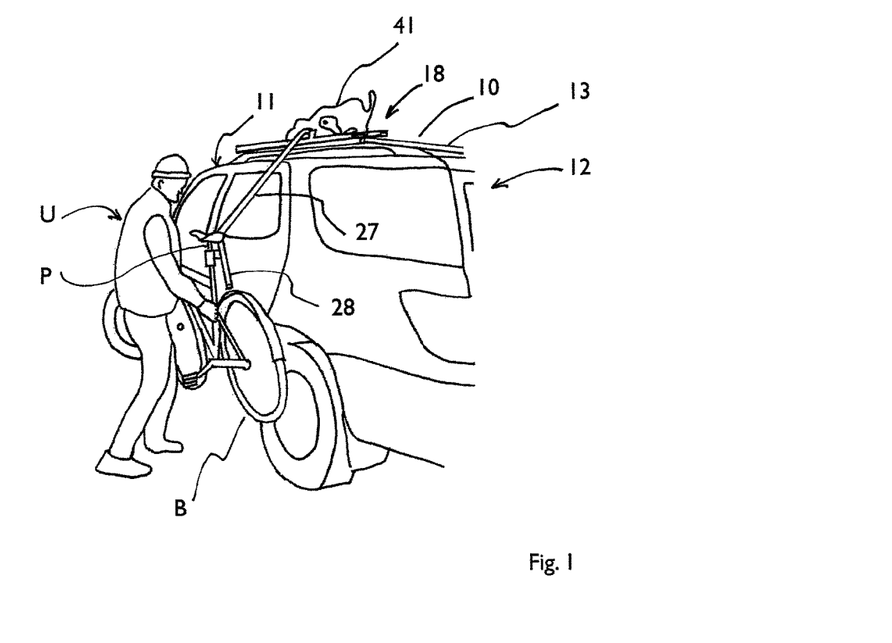
FIG. 1 is a perspective view of the invention on a vehicle with a bike attached for loading.
Figure 2:
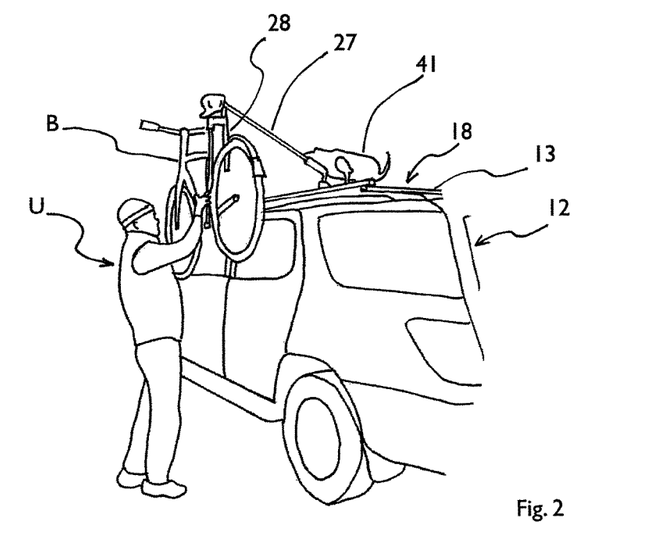
FIG. 2 is a perspective view of the invention on a vehicle with a bike attached and positioned in mid ascent or descent position.
Figure 3:
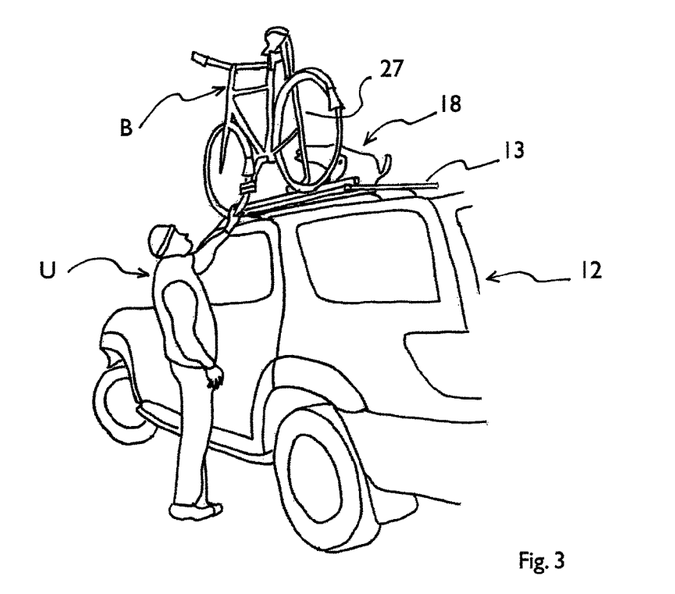
FIG. 3 is a perspective view of the invention on a vehicle with a bike attached and positioned on the roof top rack for transport.
Figure 4:
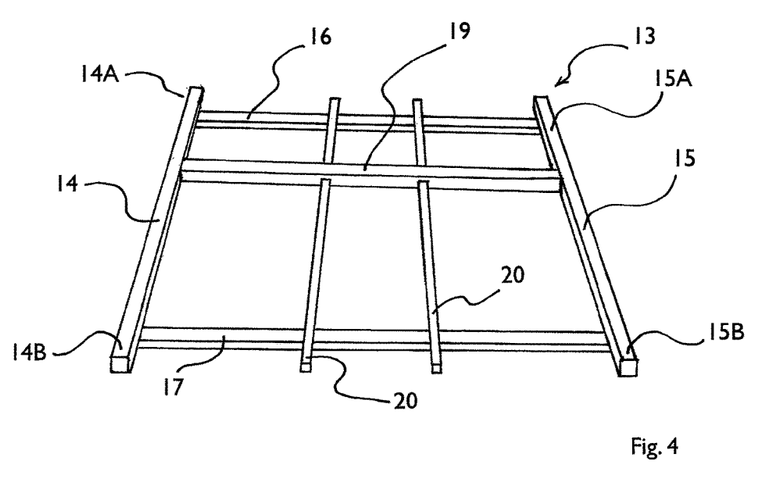
FIG. 4 is a perspective view of the roof rack of the invention.

A flexible access lanyard 40 is attached through a ring fitting 40A on the proximal end of the boom 28 allowing the user U as seen in FIGS. 1, 2 and 3 of the drawings to engage by a loop 40B on its free end for bike lift deployment and retraction placement of a bike B attached on the moving rack 13.

Referring now to FIGS. 5 and 6 of the drawings, a linkage assembly 41 can be seen pivotally secured to the mounting rack 13 by a mounting plate 42 having a pair of oppositely disposed apertured pivot points 42A and 42B on its respective ends. The linkage assembly 41 (illustrated by a dog representation) has a first link 43 (leg representation) pivoted from the pivot point 42A to a linkage body member 44 pivot point 44A thereon.

A second linkage pivot point at 44B is located in spaced relation thereto which correspondingly engages a pivot pin 45 extending from the boom 27 in spaced relation to boom's attachment pivot point as hereinbefore described.

The linkage pivot point 44B is within the graphic dog illustration of the linkage body member 44 represented by a dog head H and mouth M. The linkage assembly 41 has a gas spring cylinder 45A pivotally mounted to the apertured upstanding pivot point 42B and extending to a third linkage pivot point 44C which is in spaced oppositely disposed relation to the second linkage pivot point 44B adjacent the opposite end of the linkage body member 44. It will be evident that the gas spring cylinder 45 will aid in lifting the boom assembly as will be described in greater detail hereinafter.

Referring now back to FIG. 6 of the drawings, a hydraulic damper 46 can be seen pivotally attached between the base of the boom assembly 24 and the roof rack 13 providing controlled lever action to the boom assembly as it is pivoted and extended from the roof rack 13 to the loading position and correspondingly from the loading position back to the lifting and receiving position on the roof rack 13 during operation.

In operation, the user U as illustrated in FIGS. 1-3 of the drawings grasped the lanyard 40 and pulls the boom assembly 24 down pivoting away from the vehicle 12. By doing so, the booms 27 and 28 pivot down to extension as seen in FIG. 1 of the drawings. The boom 28 is self-stabilizing by the knee hinge 30 frictional engagement fitting between the booms. The bike B being clamped by its post P to the hereinbefore described bike clamp 32 adjustable dual jaws 34 securing same, the clamp 32 is positioned on the boom 28 by the rod portion 36 and pin 39, with the bike B now secured to the lifting boom assembly 24 by the bike clamp 32 ready to be lifted onto the roof rack 13 as illustrated in FIG. 1 of the drawings. The boom assembly 24 has been fully deployed extending, as shown, along the side of the vehicle 12 and in FIG. 7 of the drawings with the gas cylinder 45 fully retracted and compressed.

As the user U lifts the attached bike B the boom knee as seen in FIG. 2 of the drawings, the hinged pivoting booms 27 and 28 aided by the gas cylinder 45 which in combination with the hereinbefore described multiple linkage assembly 40 increases the mechanical advantage imparted thereto by repositioning the linked pivot engagement points 44A, 44B and 44C illustrated graphically in traveled path position fully extended at 46, partially extended at 47 in broken lines in FIG. 6 of the drawings and secured for transport position 48 with the pivoted booms 27 and 28 now in a nearly vertical orientation.

A linkage point to linkage point relation is shown by broken lines LP in FIGS. 5 and 6 of the drawings illustrating the relationship of the mechanical linkage advantage and gas cylinder 45A achieved by this arrangement in its deployment and retrieval travel paths.

Figure 9:
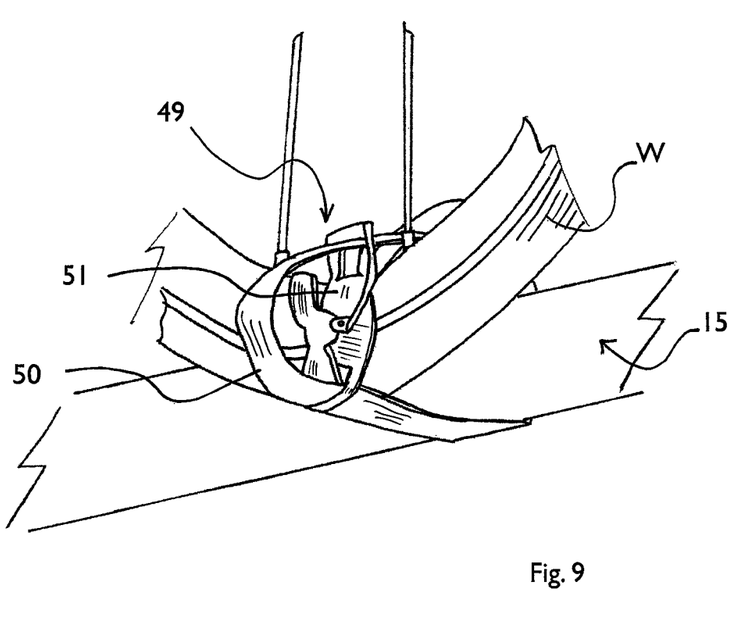
FIG. 9 is an enlarged partial perspective view of the wheel attachment strap.

Once the bike B has been lifted up onto the mounting rack 13, strap retainment assemblies 49 extending from the mounting rack 13 tubular element 15, best seen in FIG. 9 of the drawings are engagement about the respective bike wheels W. The strap retainment assemblies 49 in this example have a flexible band 50 which extends around the rack 13 and through an adjustable friction buckle clamp 51 as will be well understood by those skilled in the art selectively stabilizing the wheel to the rack 13.

It will thus be seen that a new and novel bike lifting cargo rack has been illustrated and described and it will be apparent to those skilled in the art that various changes and modifications may be made therein without departing from the spirit of the invention.

Therefore, I claim:

1. An assisted lift bicycle carrier for vehicles comprises;
    a support rack on said vehicle,
    first and second lift booms pivotally attached in end to end relation to one another and to said support rack for raising and lowering a bicycle attached to said second boom to an upright position on said support rack,
    a friction engagement fitting between said first and second booms,
    a linkage assembly pivotally secured between said first boom and said support rack, said linkage assembly having a linkage body member, an independent linkage and linkage element formed by a portion of said linkage body member,
    a gas spring cylinder pivotally secured from said support rack to a pivot point on the end of said linkage body member,
    a bike engagement clamp adjustably secured on said second boom inwardly of the boom's free end for selective attachment on said bicycle,
    a hydraulic dampening cylinder extending from said support rack to said first boom between said linkage assembly attachment and said first boom's attachment to said support rack,
    a bike wheel retainment strap on said rack having an adjustable fixation strap engagement.

2. The assisted lift bicycle carrier set forth in claim 1 wherein said support rack comprises,
    a pair of spaced parallel tubular elements, with interconnecting spaced parallel tubular end elements at right angles thereto, a main rack element extending between said tubular elements and intersected at right angles by a pair of parallel spaced bars engaging said respective tubular end elements in spaced relation to said tubular elements interconnecting said main rack element and said interconnecting tubular end elements in spaced relation thereto.

3. The assisted lift bicycle carrier set forth in claim 1 wherein said independent linkage is pivotally secured from said support rack to a first linkage pivot point on said linkage body member, said linkage element formed by said linkage body member extends from said first linkage pivot point to a pivot pin extending from said first boom, a second linkage element formed by said linkage body member from said gas spring cylinder pivot point to said pivot pin on said first boom.

4. The assisted lift bicycle carrier set forth in claim 1 having;

a flexible band extending from said second lift boom, and loop formed on a free end of said flexible band for deployment thereof.

5. The assisted lift bicycle carrier set forth in claim 1 wherein said bicycle engagement clamp comprises;

a fixed jaw member selectively adjustable for longitudinal movement along said second boom having longitudinally spaced indexing apertures for selective adjustable sliding movement and an opposing movable jaw, a connection between said jaws for incremental movement of said opposing jaw in aligned orientation towards said fixed jaw member engaged on said bicycle.

6. The assisted lift bicycle carrier set forth in claim 1 wherein said linkage assembly is movable from a first position to a second, first and second booms pivoting deployed position.

* * * * *